US006978536B2

(12) United States Patent
Gershgoren et al.

(10) Patent No.: US 6,978,536 B2
(45) Date of Patent: Dec. 27, 2005

(54) SPRING-WIRE CLIP APPLICATOR AND METHOD, AND SPRING WIRE CLIPS USEFUL THEREWITH

(75) Inventors: Sagi Gershgoren, Tel Aviv (IL); Uri Klauzner, Haifa (IL)

(73) Assignee: E-Clips Pro-Office Ltd., Hamovil (IL)

( * ) Notice: Subject to any disclaimer, the term of this patent is extended or adjusted under 35 U.S.C. 154(b) by 0 days.

(21) Appl. No.: 10/398,298

(22) PCT Filed: Oct. 1, 2001

(86) PCT No.: PCT/IL01/00917

§ 371 (c)(1), (2), (4) Date: Jun. 11, 2003

(87) PCT Pub. No.: WO02/28217

PCT Pub. Date: Apr. 11, 2002

(65) Prior Publication Data

US 2004/0020032 A1 Feb. 5, 2004

(30) Foreign Application Priority Data

Oct. 3, 2000 (IL) ................................................ 138833

(51) Int. Cl.$^{7}$ ............................ B65G 59/00; B23Q 7/10
(52) U.S. Cl. ............................ 29/809; 29/814; 221/261
(58) Field of Search ..................... 29/809, 814, 243.58, 29/243.56, 450, 452, 464, 468; 221/276, 273, 275, 232

(56) References Cited

U.S. PATENT DOCUMENTS

| | | | | | |
|---|---|---|---|---|---|
| 3,235,950 | A | * | 2/1966 | Smotzer, Jr. | 221/276 |
| 3,254,398 | A | * | 6/1966 | Macondray et al. | 29/814 |
| 3,402,454 | A | * | 9/1968 | Hartman | 29/56.5 |
| 3,429,431 | A | * | 2/1969 | Macondray et al. | 206/338 |
| 3,829,954 | A | | 8/1974 | Takamizawa et al. | |
| 4,261,098 | A | | 4/1981 | Lincoln | |
| 4,353,157 | A | | 10/1982 | Sato | |
| 5,890,642 | A | | 4/1999 | Sato | |
| 6,067,706 | A | | 5/2000 | Sato | |
| 6,206,236 | B1 | * | 3/2001 | Hakala | 221/276 |

* cited by examiner

*Primary Examiner*—Marc Jimenez
(74) *Attorney, Agent, or Firm*—Greer, Burns & Crain, Ltd.

(57) ABSTRACT

An applicator for applying, to a plurality of sheets, spring-wire clips made of bent spring-wire having first and second end sections joined together by an elastically-deformable wire juncture section. The applicator includes a holder for holding a plurality of the spring-wire clips to feed them sequentially to a sheet-clipping station, with the wire juncture section facing one side of the station; a driving member at one side of the sheet-clipping station for engaging the clip and for driving the clip towards another side of the sheet-clipping station; and at least one deflector located to engage at least one of the end sections of the clip driven by the driving member. The deflector deflects the engaged end section away from the other end section to receive the sheets at the other side of the sheet-clipping station to be clipped by the driven clip.

20 Claims, 11 Drawing Sheets

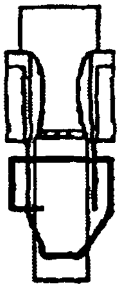
Fig. 8a
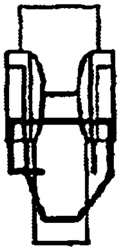
Fig. 8b
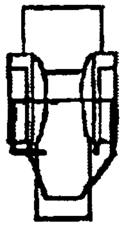
Fig. 8c
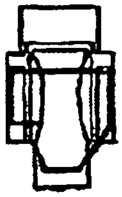
Fig. 8d
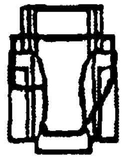
Fig. 8e
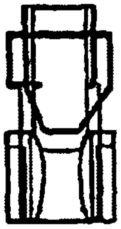
Fig. 8f
Fig. 9a
Fig. 9b
Fig. 9c
Fig. 9d
Fig. 9e
Fig. 9f

SPRING-WIRE CLIP APPLICATOR AND METHOD, AND SPRING WIRE CLIPS USEFUL THEREWITH

FIELD AND BACKGROUND OF THE INVENTION

The present invention relates to an applicator for applying spring-wire clips to paper sheets and other sheet materials.

Staplers are commonly used for stapling together a plurality of sheets of paper or other sheet materials. However, staplers do not permit convenient removal or addition of sheets since this requires first removing the staple. While it is known to use various types of applicator devices for applying clips of the leaf-spring type to a plurality of sheets, e.g., as illustrated in U.S. Pat. Nos. 4,353,157, 5,890,642 and 6,067,706, in-so-far as we are aware, clips of the spring-wire type (such as the common paper clips) are generally applied to sheets manually, by holding the stack of sheets in one hand, and using the other hand for manually applying the spring-wire clip thereto.

OBJECTS AND BRIEF SUMMARY OF THE INVENTION

An object of the present invention is to provide an applicator for applying clips of the spring-wire type to a stack of sheets such as to permit convenient removal or addition of sheets.

According to one aspect of the present invention, there is provided an applicator for applying, to a plurality of sheets, clips made of bent spring-wire having first and second end sections joined together by an elastically-deformable wire juncture section, said applicator comprising:

a holder for holding a plurality of said clips in a manner to successively feed them one at a time to a sheet-clipping stations with the wire juncture section facing one side of the sheet-clipping station;

and a driving member at said one side of the sheet-clipping station for engaging the clip in the sheet-clipping station and for driving the clip towards the other side of the sheet-clipping station for spreading said end sections apart in order to receive the sheets to be clipped by the driven clip;

characterized in that said holder is configured to hold clips in which said first end section of each clip overlies said second end section of the respective clip, is wider than said second end section such as to project outwardly thereof on the opposite sides of said clip, and is shorter than said second end section such that said second end section projects axially past said first end section;

and further characterized in that said applicator further comprises a first pair of deflector surfaces located on opposite sides of said clip to engage the underside of outwardly projecting portions of the first end section of the clip, when driven by said driving member, and configured to deflect said first end section away from said second end section; and a second pair of deflector surfaces located on opposite sides of said clip axis to engage an upper side of the axially projecting portion of said second end sections of the clip, when driven by said driving member, and configured to constrain said second end section, or to deflect said second end section away from said first end section.

According to further features in one described preferred embodiment of the invention, the first pair of deflector surfaces are upwardly sloping surfaces, and the second pair of deflector surfaces are downwardly sloping surfaces.

According to still further preferred features in that embodiment of the invention, the driving member is a sliding bar engageable with the wire juncture section of the clip in the sheet-clipping station. In addition, the holder is configured to hold clips in which said first end section carries a strip having advertising thereon.

According to another aspect of the present invention, there is provided an applicator for applying, to a plurality of sheets, clips made of bent spring-wire having first and second end sections spaced from each other and joined together by an elastically-deformable wire juncture section, the applicator comprising: a holder for holding a plurality of the clips in a manner to successively feed them one at a time to a sheet-clipping station; a driving member at the sheet-clipping station for engaging the clip in the sheet-clipping station and for driving the engaged clip towards the plurality of sheets to be clipped; and a deflector extending through the space between the first and second end sections of the clip in the sheet-clipping station, the deflector being located to engage one of the end sections of the clip in the sheet-clipping station and to deflect the engaged end section away from the other end section when the clip is driven by the driving member towards the plurality of sheets, for spreading the end sections apart in order to receive the plurality of sheets between the spaced end sections of the clip.

In one described preferred embodiment, the first and second end sections of the clips are spaced from each other along the longitudinal axis of the clip, and the deflector is substantially aligned with the longitudinal axis to engage a portion of the one end section extending transversely across the longitudinal axis.

Another embodiment is described wherein the first and second end sections of the clips are angularly spaced from each other, and the driving member is a rotary drive member engageable with the wire juncture section of the clip in the sheet-clipping station to rotate the clip towards the plurality of sheets to be clipped.

It will thus be seen that an applicator constructed in accordance with the foregoing features may be used for applying spring-wire clips to a plurality of sheets in a quick and convenient manner such that, after a clip has been applied, the clipped sheets may also be quickly and conveniently separated for purposes of removing or adding sheets, the clips may be supplied in the form of individual clips which can be conveniently loaded into the applicator holder, or in the form of cartridges which can be quickly and conveniently attached and removed from the applicator. The clips may also be supplied in the form of an assemblage of clips interconnected by severance lines enabling individual clips to be severed from the assemblage at the time of application of a clip to the sheets. Such clips may also carry advertising.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a three-dimensional view illustrating one form of spring-wire clip applicator constructed in accordance with the present invention;

FIG. 1*b* illustrates a modification in the construction of the spring-wire clip of FIG. 1*a* to better enable it to be driven by the applicator, as well as to increase the gripping surface and to enable it to carry advertising or the like;

FIGS. 8*a*–8*f* are top views, and FIGS. 9*a*–9*f* are corresponding side views, more particularly illustrating the various stages involved in the operation of the applicator of FIGS. 5 and 6 for applying a spring-wire clip according to FIG. 4 to a plurality of sheets;

DESCRIPTION OF PREFERRED EMBODIMENTS

Figure 1B:
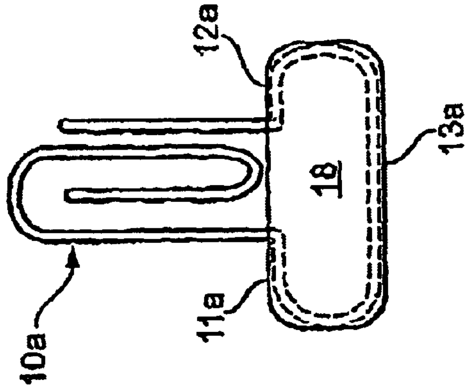
Figure 1C:
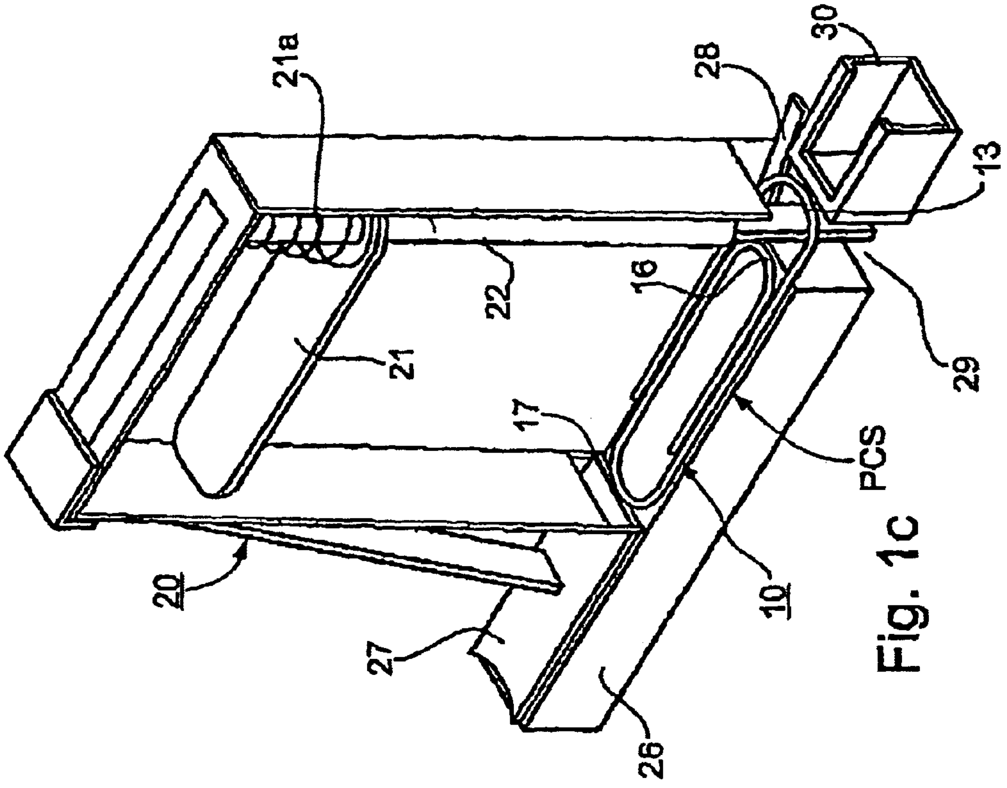
Figure 1A:
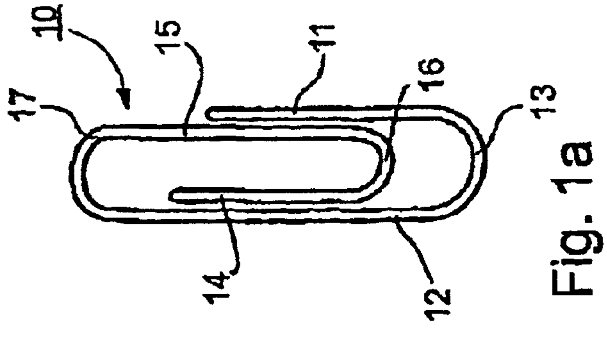
FIG. 1*a* more particularly illustrates the spring-wire clip used in the applicator of FIG. 1.

The applicator illustrated in FIG. 1 is particularly for use with the common spring-wire clip of the double-U construction as illustrated in FIG. 1*a*. Such a spring-wire clip, therein generally designated 10, is made of a length of spring wire bent to form two straight, parallel legs 11, 12 joined together by a U-bend 13, and two straight, parallel legs 14, 15 joined together by a U-bend 16, with leg 15 joined to leg 12 by another U-bend 17.

It will thus be seen that in such a spring-wire clip, as clearly shown in FIG. 1*a*, legs 11, 12, together with the U-bend 13, form one end section at one end of the clip; legs 14, 15, together with the U-bend 16, form another end section at the same end of the clip but spaced therefrom along the longitudinal axis of the clip; and U-bend 17 defines an elastically-deformable wire juncture section at the opposite end of the clip for joining the two end sections of elements 11–13 and 14–16, respectively. As seen in FIG. 1*a*, end section of elements 11–13 is coplanar with, and longer than, the end section of elements 14–16 in the normal, unstressed (non-gripping) condition of the clip.

Such spring-wire clips are generally applied manually by assembling the paper sheets to be clipped in a stack and pressing the stack against the projecting end section of elements 11–13, to separate that end section from the end section of elements 14–16; and then inserting the sheets into the space between the two separated end sections. When the spring-wire clip is so applied, the elastically-deformable wire juncture section 17 presses the two end sections towards each other to releasably grip and retain the paper sheets together.

The applicator illustrated in FIGS. 1 and 2*a*–2*c* is designed particularly for use with the spring-wire clip of the above-described conventional construction as illustrated in FIG. 1*a*.

Thus, the applicator illustrated in FIG. 1 includes a holder, generally designated 20, for holding a plurality of the spring-wire clips 10 in a stack to successively feed them one at a time to a sheet-clipping station, in this case to paper-clipping station PCS. FIG. 1 illustrates spring-wire clip 10 in station PCS, wherein it will be seen that the spring-wire clip is oriented such that the wire juncture section 17 faces one side of station PCS, and the two end sections, of elements 11–13 and 14–16, respectively, face the opposite side of station PCS.

As further shown in FIG. 1, holder 20 includes a spring-urged member 21 urged downwardly by a spring 21*a* which is loaded when the holder is loaded with a stack of the spring-wire clips 10. Member 21 bears against the uppermost clip of the stack and urges the clips downwardly towards the paper-clipping station PCS occupied by the illustrated clip 10 in FIG. 1.

Holder 20 further includes a deflector member 22 in the form of an elastic leaf spring, or other spring mechanism, located so as to extend through the space between the U-bends 13 and 16 of the two end sections in the stack of clips 10 within the holder. The stack of clips 10 may be manually loaded within holder 20, but may also be loaded by means of a cartridge, shown at 23 in FIGS. 2*a*–2*c*. When using a cartridge for loading the spring-wire clips, the upper wall 24 of the cartridge is movable within the cartridge and engages the spring-urged pressure member 21 within the holder. In addition, wall 24 is formed with an opening 25 for receiving the elastic leaf spring 22 within the holder.

The paper-clipping station PCS for receiving each spring-wire clip 10 to be applied, is defined by a base 26 underlying the holder 20. A driving member in the form of a slide 27 is slidably mounted on one side of base 26 at the end of station PCS occupied by the wire juncture section 17 of the spring-wire clip 10 within that station. The opposite side of base 26 facing the two end sections 11–13 and 14–16, respectively, of the spring-wire clip 10 within station PCS, is formed with a rising slope 28, for engaging the spring-wire clip end section of elements 11–13 and for deflecting that end section away from the end section of elements 14–16, as will be described more particularly below.

Base 26 further includes a cut-out or space 29 for accommodating the elastic leaf spring 22, and a sheet registering member 30 for engaging and registering the plurality of sheets to be spring-wire clipped together. Member 30 is of a U-configuration to provide space for accommodating the leaf spring during a paper-clipping operation, as described below.

Figure 2C:
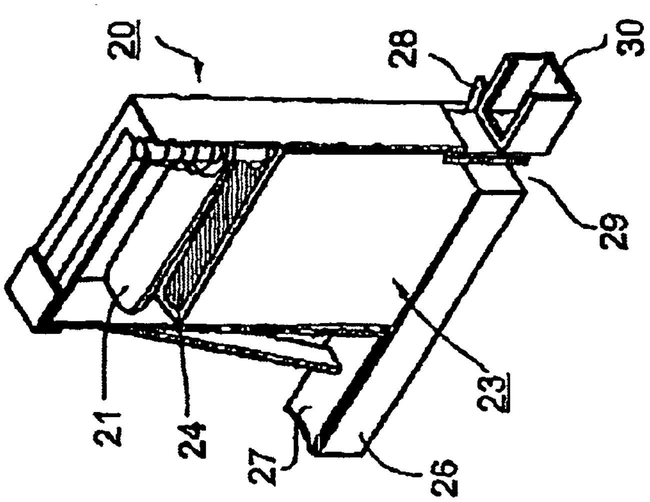
FIGS. 2*a*, 2*b* and 2*c* illustrate three stages in applying a cartridge of spring-wire clips to the applicator of FIG. 1.
Figure 2B:
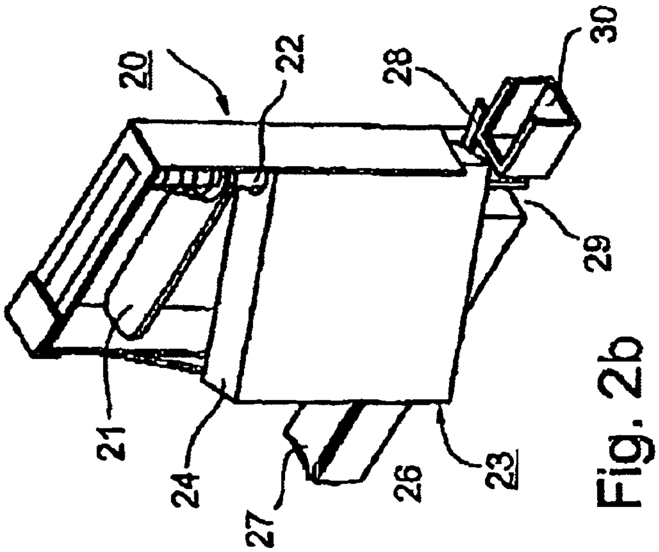
Figure 2A:
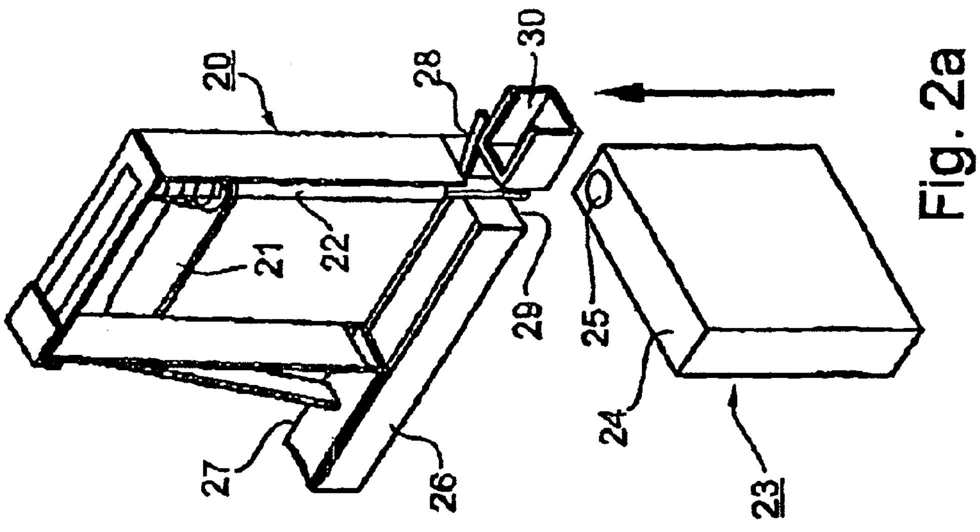

FIGS. 2*a*–2*c* illustrate the manner of applying the cartridge 23 to the applicator. As shown in FIG. 2*a*, the cartridge 23, filled with the spring-wire clips 10, is passed through space 29 in the applicator base 26, with the leaf spring 22 of the holder 20 aligned with the hole 25 in the top wall 24 of the cartridge. The cartridge is then moved upwardly within the holder 20 to overlie the base 26, as shown in FIG. 2*b*. The cartridge is then pivoted about the leaf spring 22 and snapped in position over the base 26, with the pressure member 21 of the holder 20 pressing down against the movable top wall 24 of the cartridge, as shown in FIG. 2*c*.

When it is desired to apply a clip 10 to a plurality of sheets, the sheets are assembled and placed against the sheet registering member 30, underlying the upwardly-sloped deflector 28. In this condition of the applicator, slide 27 is adjacent to, or in contact with, the wire juncture section 17 of the clip 10 within the paper-clipping station PCS. In addition, the elastic leaf spring 22 extends through the space between the two end sections of elements 11–13, and 14–16, respectively, substantially aligned with the longitudinal axis, of the spring-wire clip 10 in station PCS.

Figure 3E:
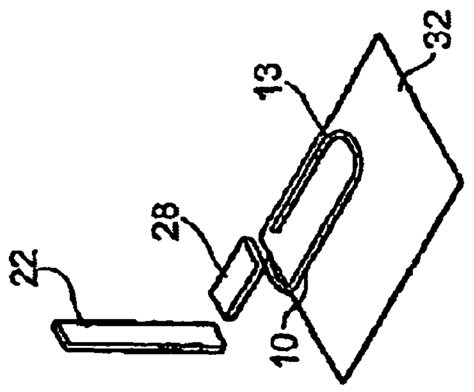
FIGS. 3*a*–3*e* illustrate various stages in the operation of the applicator of FIG. 1 for applying spring-wire clips to a plurality of sheets.
Figure 3D:
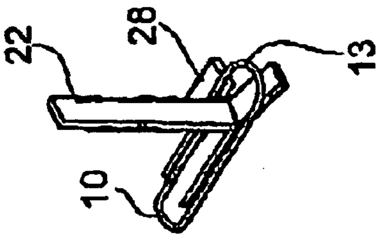
Figure 3C:
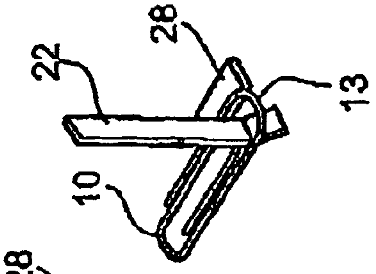
Figure 3B:
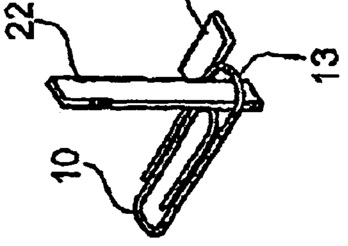
Figure 3A:
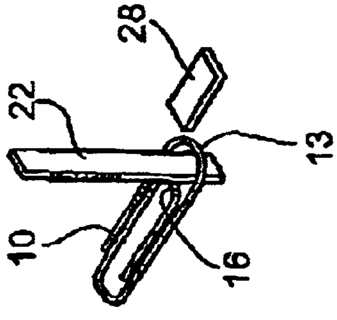

Slide 27 is then driven, manually or by a drive mechanism not shown, rightwardly in FIG. 1, to thereby drive spring-wire clip 10 in the paper-clipping station PCS rightwardly towards the paper registering member 30. FIGS. 3*a*–3*e* diagrammatically illustrate the sequence of events occurring during this action. Thus, as the spring-wire clip is moved rightwardly, leaf spring 22, engaging the U-bend 16 extending transversely across the clip, deflects downwardly the shorter end section of elements 14–16 of the clip, while the leaf spring is deflected into the space of the U-shaped paper registering member 30. Continued movement of the spring-wire clip 10 rightwardly causes U-bend 13 of the longer end section of elements 11–13 of the spring-wire clip 10 to engage the upwardly-sloping deflector element 28, and to be deflected upwardly thereby. These two deflections of the end sections of the spring-wire clip 10 spread them apart sufficiently to receive the paper sheets 32 applied to the paper registering member 30, as shown in FIG. 3*e*.

FIG. 1*b* illustrates a modification in the construction of the spring-wire clip 10 usable in the applicator of FIGS. 1 and 2. In this modification designated 10*a* in FIG. 1*b*, the longer end section of elements 11–13, designated 11*a*–13*a*, is enlarged in width to form a T-shape. This T-shaped clip is specially designed to allow the clip to be driven by a modification of the applicator, illustrated in FIG. 1, as described below, as well as to better grip the sheets and to support a strip 18 carrying advertising. The structure of spring-wire clip 10*a* illustrated in FIG. 1*b* is otherwise the same as described above with respect to FIG. 1*a*, and may be driven in the same manner by the applicator illustrated in FIG. 1 as described above. Preferably, however, the base would include two rising slopes corresponding to slope 28, to engage the two widened elements 11*a* and 12*a* of the clip 10*a*.

Figure 6:
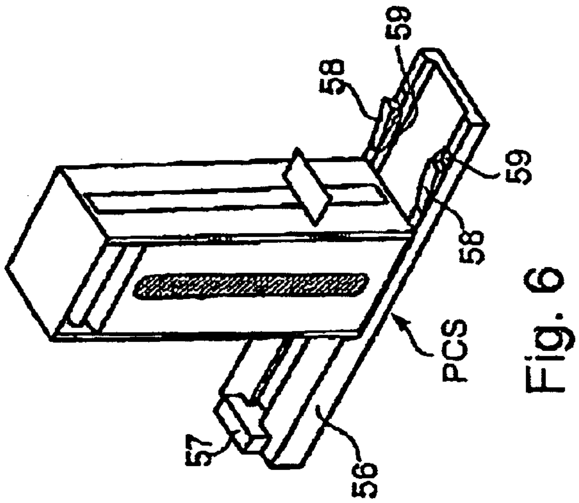
FIG. 6 is a perspective view illustrating the assembled condition of the applicator of FIG. 5.
Figure 4:
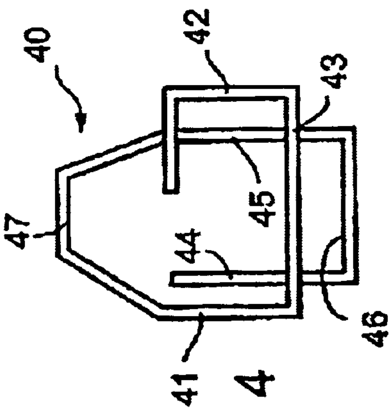
FIG. 4 illustrates the construction of another spring-wire clip that may be applied by an applicator constructed in accordance with the present invention.
Figure 5:
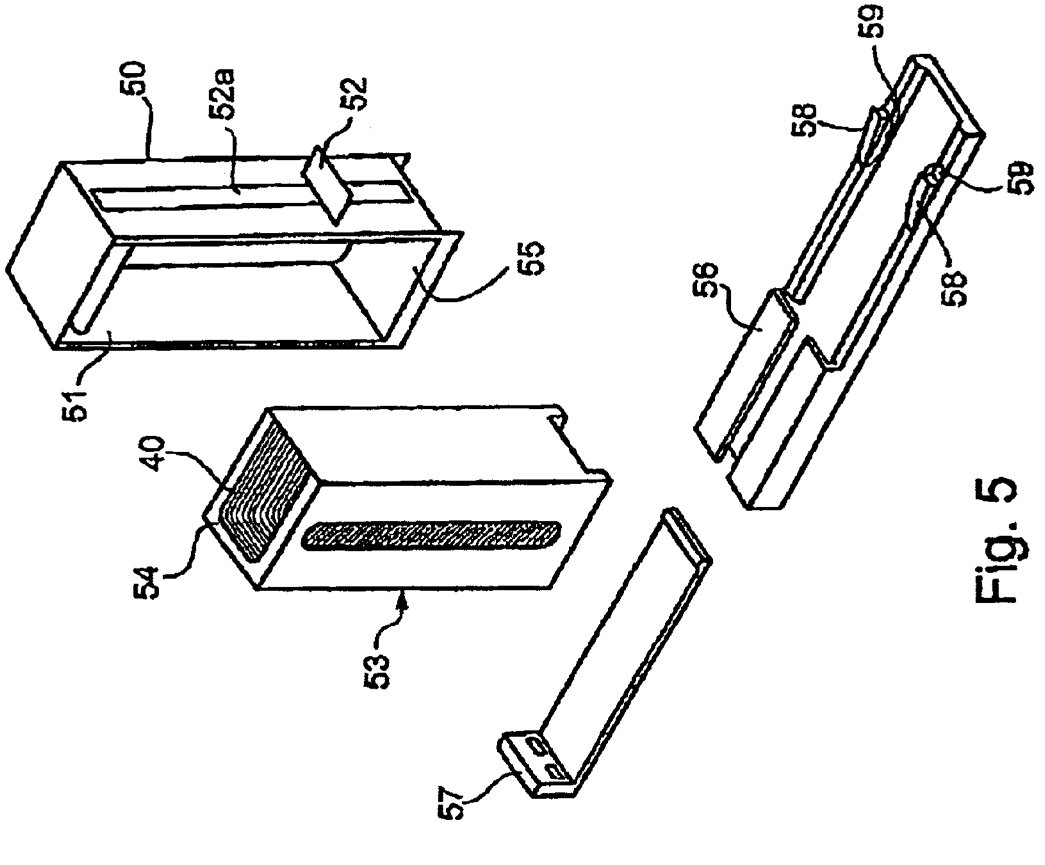
FIG. 5 is an exploded view illustrating an applicator constructed in accordance with the present invention for applying the spring-wire clip of FIG. 4.

FIG. 4 illustrates another type of spring-wire clip which may be applied by an applicator constructed in accordance with the present invention, and FIGS. 5 and 6 illustrate an applicator constructed in accordance with the invention particularly for applying the spring-wire clip of FIG. 4.

The spring-wire clip illustrated in FIG. 4, and therein generally designated 40, also includes a length of spring wire bent to form a first end section constituted of two straight parallel legs 41, 42 joined by a U-bend 43, and a second end section constituted of two straight parallel legs 44, 45, joined by a U-bend 46. The end section of elements 41–43 is joined by an elastically-deformable wire juncture section 47 to the end section defined by elements 44–46.

In this case, however, the two end sections are not coplanar in the normal, unstressed condition of this clip. Rather, the end section of elements 41–43 overlies the end section of elements 44–46. In addition, the end section of elements 41–43 is wider, but shorter, than the end section of elements 44–46, such that the end section of elements 41–43 projects outwardly of the end section of element 46 on opposite sides of the clip, whereas the end section of elements 44–46 projects past end section of elements 41–43.

The applicator illustrated in FIGS. 5 and 6 also includes a holder 50 for holding a plurality of the spring-wire clips 40. In this case, the holder 50 includes a pressure member 51 urged downwardly by a spring or other pressing mechanism (not shown) and movable to its upper position by a pair of finger pieces 52 slidable within slots 52*a* in the side walls of the clip holder 50. Finger pieces 52 are connected by flexible strips (not shown) extending across the top of the holder to the opposite sides of the pressure member 51, such that movement of the finger pieces 52 downwardly raises the pressure member 51 upwardly within the holder against the spring, or by other lifting mechanism.

In the embodiment of FIGS. 5 and 6, the spring-wire clips are also loaded by the use of a cartridge 53. The upper end of cartridge 53 is open at its top as shown at 54, so that the cartridge may be inserted through an opening 55 in the side wall of the holder 50 with the pressure member 51 engaging the upper spring-wire clip 40 within the cartridge 53.

The applicator illustrated in FIGS. 5 and 6 also includes a base 56 underlying the holder 50 and defining the paper-clipping station PCS to which the spring-wire clips 40 are successively fed, one at a time, by the spring-urged pressure member 51. A slide 57 is slidably mounted on one side of base 56 to engage the wire juncture section 47 (or the wire juncture section 46) of the spring-wire clip 40 in station PCS, and to drive the spring-wire clip rightwardly. The base 56 is formed, at the opposite side of station PCS, with two pairs of deflector surfaces 58, 59, engageable with the two end sections of the spring-wire clip 40 for spreading them apart as the spring-wire clip is driven rightwardly by the driving slide 57. Surface 58 is an upwardly-sloping surface located and sloped so as to engage the portion of U-bend 43 of the spring-wire clip 40 between legs 42 and 45, and/or between legs 41 and 44, and is upwardly inclined so as to deflect upwardly the end section of spring-wire clip 40 constituted of elements 41–43. Surface 59 is a downwardly-sloping (or horizontal) surface located and shaped so as to engage U-bend 46, and thereby to deflect downwardly (or constrain) the end section of elements 44–46 of the spring-wire clip 40 as it is driven by the driving slide 57.

Figure 7A:
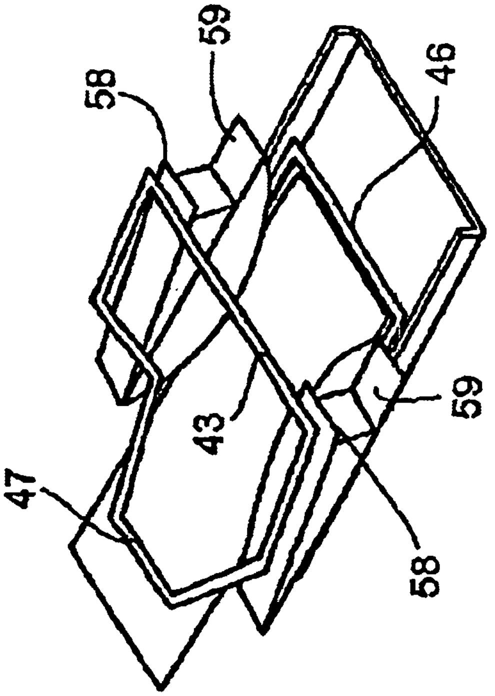
FIGS. 7*a* and 7*b* illustrate two stages in using the applicator of FIGS. 5 and 6 for applying a spring-wire clip according to FIG. 4 to a plurality of sheets.
Figure 7B:
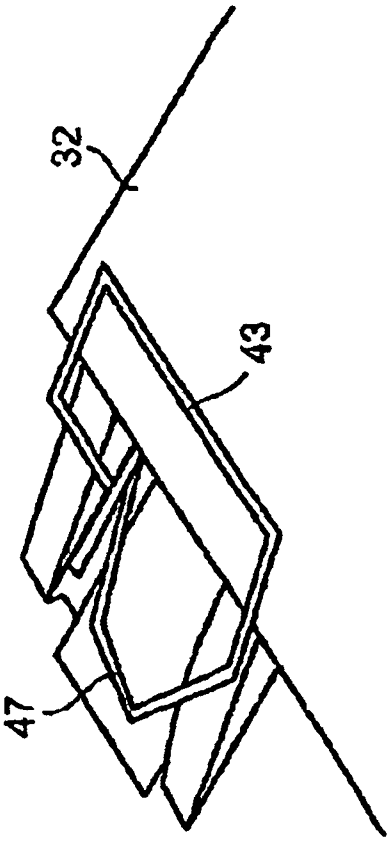

As shown particularly in FIGS. 7*a* and 7*b*, deflector surfaces 58 are located on the opposite sides of the clip, to engage the underside of the outwardly projecting portion of the wide end section (of elements 41–43) when the clip is driven by the driving member, and are configured to deflect the wide end section upwardly, away from the long end section (of elements 44–46). On the other hand, the pair of deflector surfaces 59, also located on the opposite sides of the clip but closer to each other than deflector surfaces 58, are effective to engage the upper side of the axially projecting portion of the long end section when the clip is driven by the driving member, and are configured to constrain the long end section or deflect that end section downwardly, away from the wide end section.

FIG. 7*a* more particularly illustrates the two sloping surfaces 58, 59, and the manner in which these surfaces spread apart the two end sections as described above; and FIG. 7*b* more particularly illustrates the final position of the spring-wire clip after being applied to the paper sheets 32. FIGS. 8*a*–8*f* are top views, and FIGS. 9*a*–9*f* are corresponding views, more particularly illustrating the sequential operation of the foregoing elements of the applicator during the application of a spring-wire clip to the paper sheets.

Figure 10:
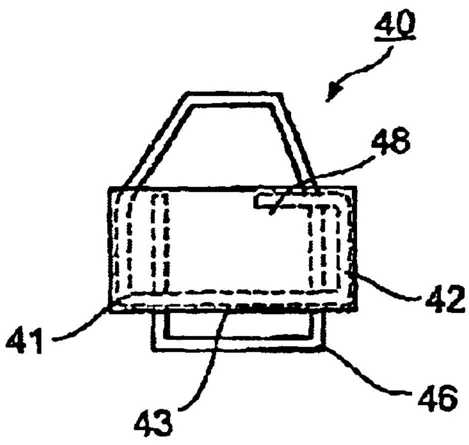
FIG. 10 illustrates a spring-wire clip according to the construction of FIG. 4 but provided with advertising.
Figure 10A:
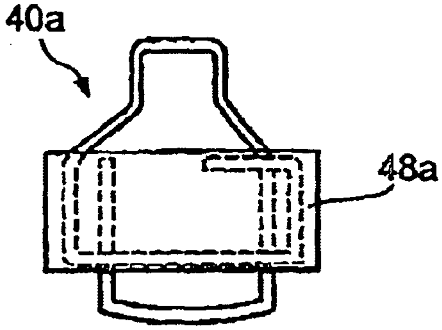
FIGS. 10*a*–10*d* illustrate examples of various modifications in the construction of the spring-wire clip in FIG. 10.
Figure 10C:
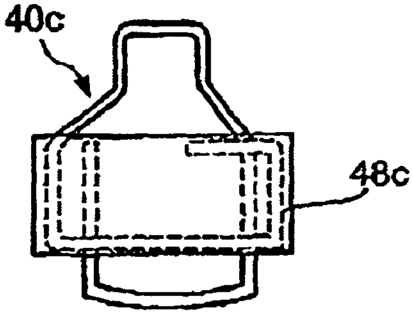
Figure 10B:
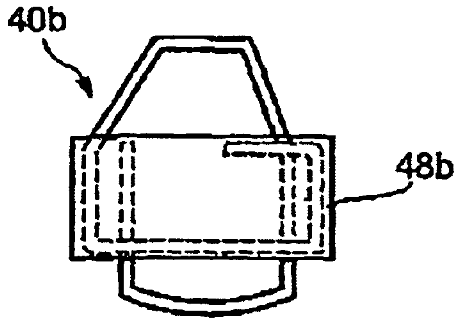
Figure 10D:
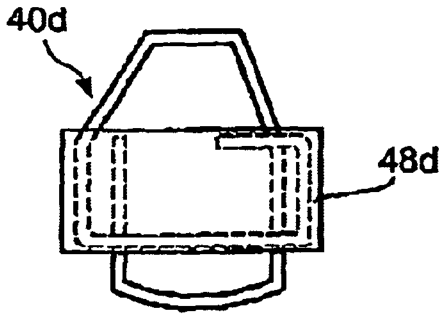

The spring-wire clip 40, illustrated in FIG. 4 can also be widened, for providing a large gripping surface, and/or for carrying a strip having advertising thereon. This is shown in FIG. 10, wherein the widened strip 48 is carried by the end section including the legs 41, 42 and the U-bend 43. As shown in FIG. 10, this end section overlies the end section of elements 44–46; it is wider, and also shorter, than that end section.

It will be appreciated that the spring-wire clips could have different constructions according to the particular application. FIGS. 10*a*–10*d* illustrate a number of possible variations, therein designated 40*a*–40*d*, in the spring-wire clip construction of FIG. 10. All these variations also include a widened, advertising-carrying strip, as shown at 48*a*–48*d*, respectively, carried by one of the end sections of the spring-Wire clip. Many other variations will be apparent.

Figure 13:
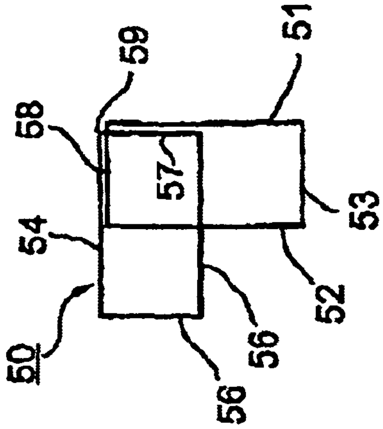
FIG. 13 illustrates one form of spring-wire clip particularly useful with the applicator of FIGS. 11 and 12.
Figure 12:
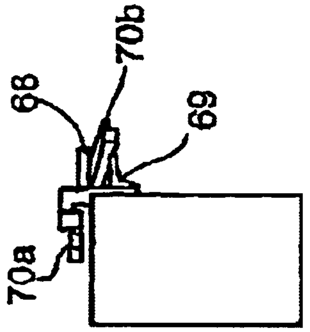
FIG. 12 is a diagram better illustrating the location of certain elements of the applicator of FIG. 11.
Figure 11:
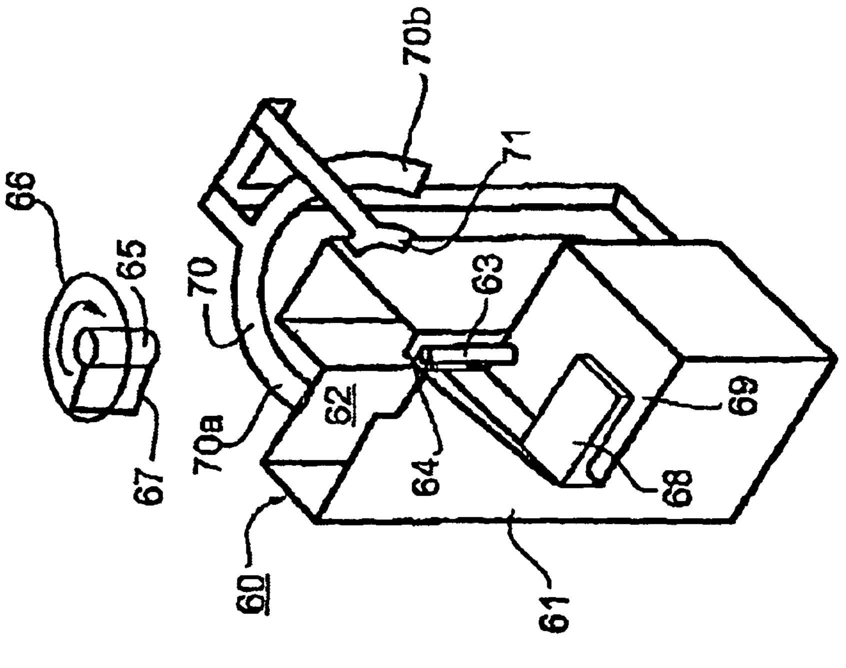
FIG. 11 illustrates another form of spring-wire clip applicator constricted in accordance with the present invention.

FIGS. 11 and 12 illustrate a rotary-type applicator constructed in accordance with the present invention, and FIG. 13 illustrates the construction of the spring-wire clip particularly useful with the applicator of FIGS. 11 and 12.

The spring-wire clip illustrated in FIG. 13, therein generally designated 50, is also made of bent spring wire having a first end section constituted of legs 51, 52, 53, and a second end section constituted of legs 54, 55, 56, the two end sections being joined together by an elastically-deformable wire juncture section, constituted of legs 57 and 58. Also in this case, the two end sections are not coplanar; the end section of elements 51–53 underlies the end section of elements 54–56. However, here the two end sections are not parallel, but rather are at an angle to each other, being shown as perpendicularly to each other in FIG. 13.

The applicator shown in FIGS. 11 and 12, therein generally designated 60, includes a holder 61 defining a compartment 62 for receiving a stack of the spring-wire clips 50 as shown in FIG. 13. The illustrated applicator further includes a vertical post 63 extending through compartment 62 and formed with a socket 64 at its upper end for rotatably receiving a stem 65 depending from a rotary drive member 66. The latter member also includes a drive element 67 which, when member 66 is rotated, is effective to drive the upper spring-wire clip 50 within compartment 62 towards a stack of sheets to be clipped by the spring-wire clip driven by drive element 67.

The applicator 60 further includes a pair of sheet aligning members 68, 69 for engaging and aligning the paper sheets to be clipped by the driven spring-wire clip 50. One side of the stack of paper sheets is received between the aligning members 68, 69, while the other side of the stack of paper sheets is received between two deflector elements 70, 71 which, as will be described more particularly below, are effective to spread-apart the two leg sections of the spring-wire clip 50 as it is driven into clipping position with respect to the stack of sheets.

As seen particularly in FIG. 11, deflector element 70 is an inclined element, sloping downwardly from one end 70*a* towards its opposite end 70*b*. Deflector element 71 is in the form of a tongue located at a mid-position between the upper end 70*a* and the lower end 70*b* of the sloping deflector element 70.

Figure 15A:
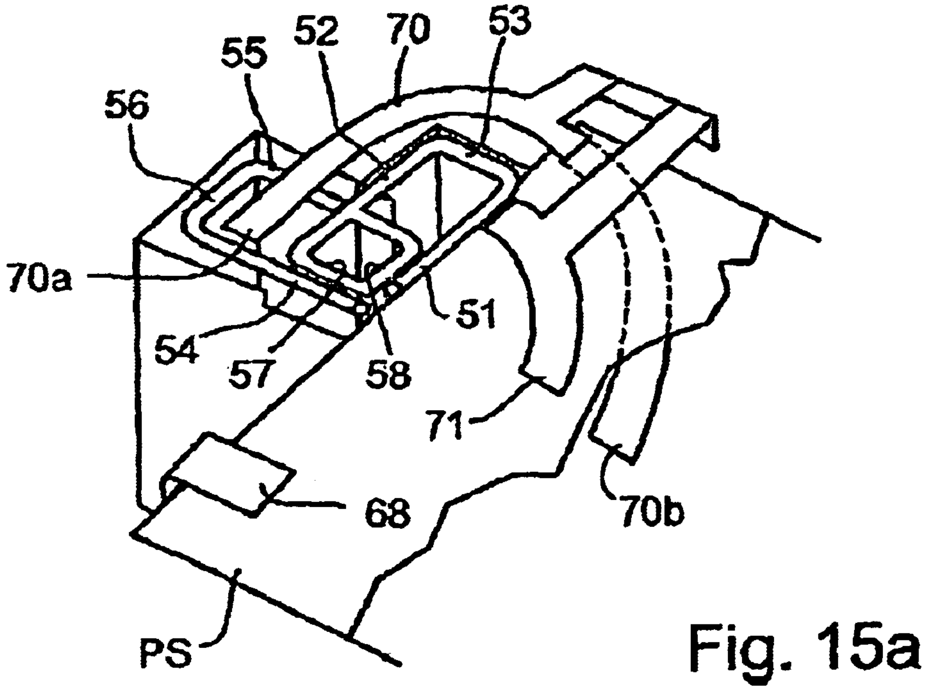
FIGS. 15*a*–15*e* illustrate various stages in the operation of the applicator of FIGS. 11 and 12 for applying a spring-wire clip to a plurality of sheets.

The spring-wire clips 50 are loaded into compartment 62 of the applicator holder 61 and are spring urged in the upward direction by a spring or other pressing mechanism (not shown), such as to successively feed each of the spring-wire clips to a paper-clipping station at the upper end of the holder. When the spring-wire clips are so loaded within the holder, the uppermost spring-wire clip is in the position as illustrated in FIG. 15*a* wherein: end section 54–56 underlies the upper end 70*a* of the sloping deflector element 70; end section 51–53 overlies tongue 71; and leg 52 is aligned with the driver element 67 of the rotary driver member 66.

Figure 15B:
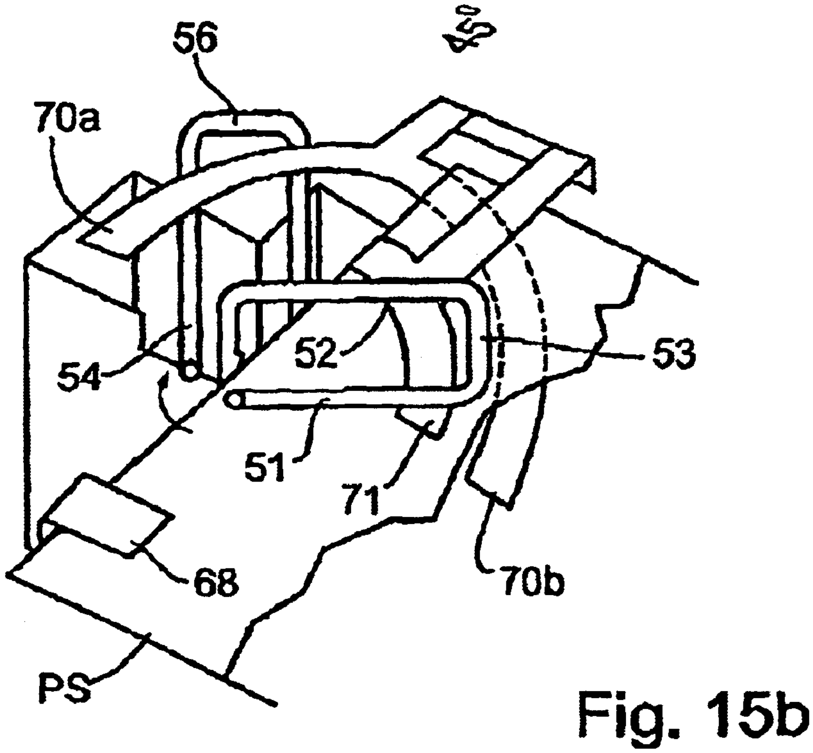
Figure 15C:
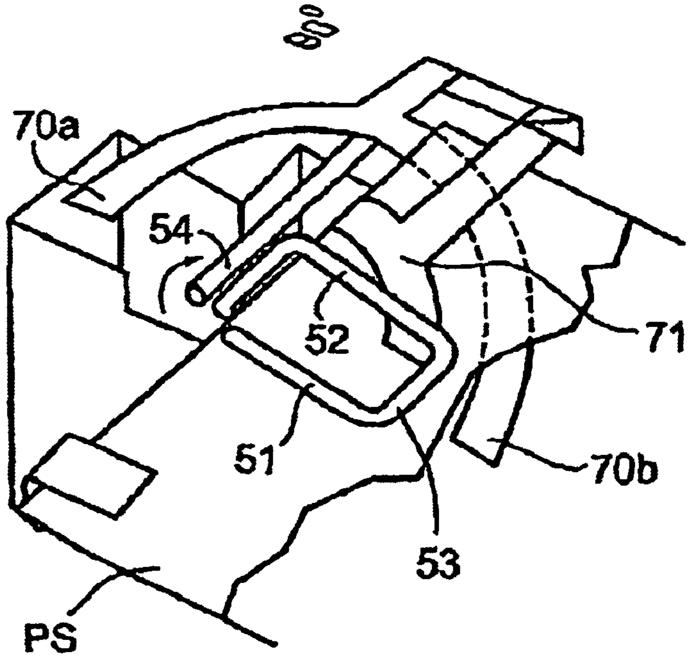
Figure 15D:
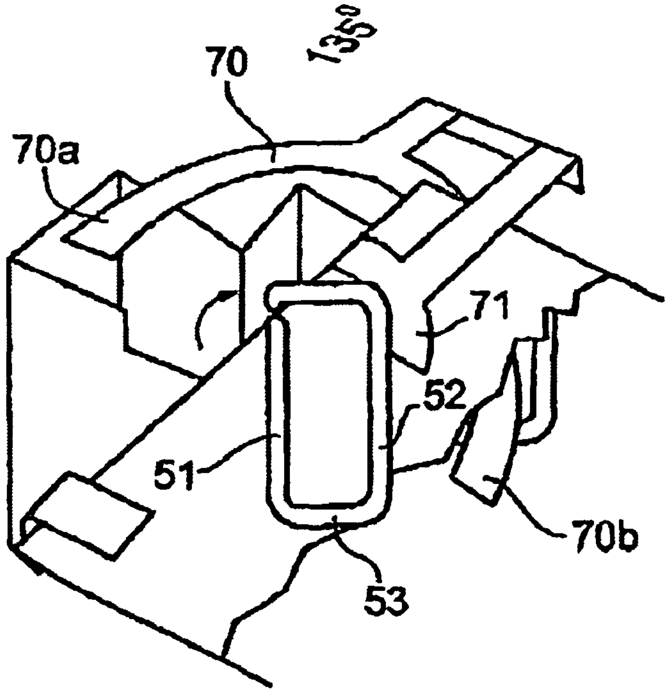
Figure 15E:
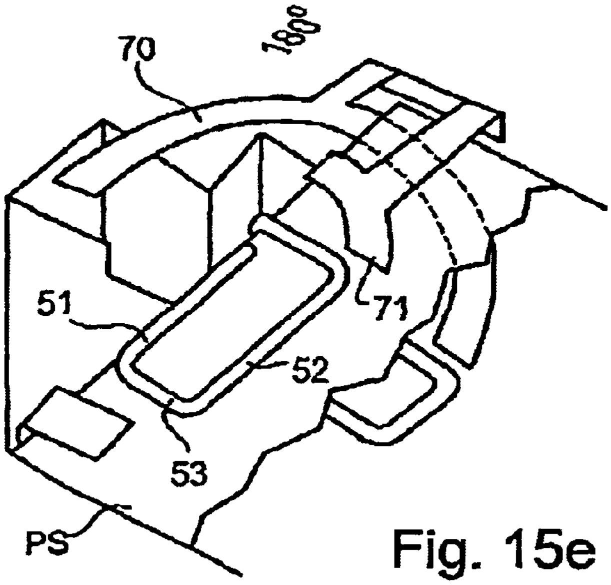
Figure 15F:
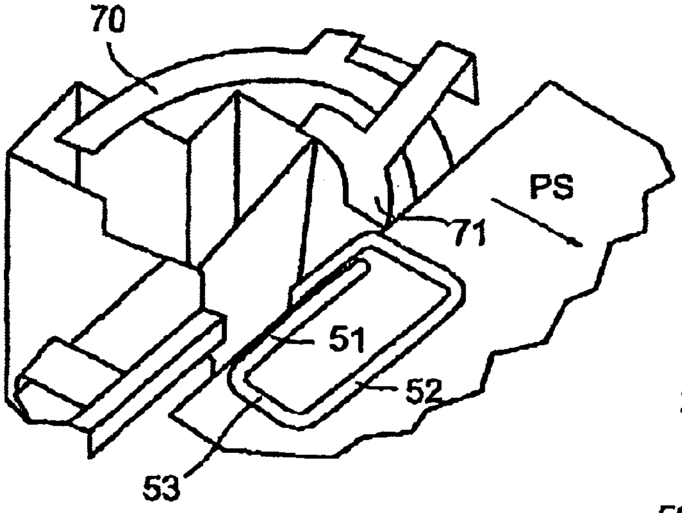

The rotary driver member 66 is then rotated clockwise, as shown by the arrow in FIG. 15*b*, either manually or automatically by any suitable drive. Driver element 67, bearing against leg 52 of the uppermost spring-wire clip in the stack, rotates the spring-wire clip as shown in FIGS. 15*b*, 15*c*, 15*d* and 15*e*, 180° to the position shown in FIG. 5*e*, while at the same time the sloping deflector element 70 deflects end section 54–56 of the spring-wire clip 50 downwardly, to spread it apart from end section 51–53, and thereby to form a space between the two end sections for receiving the paper sheets PS. At the completion of the rotation of the spring-wire clip 50, leg end section 54–56 snaps back upwardly towards end section 51–53 to retain the paper sheets between the two legs.

Figure 14:
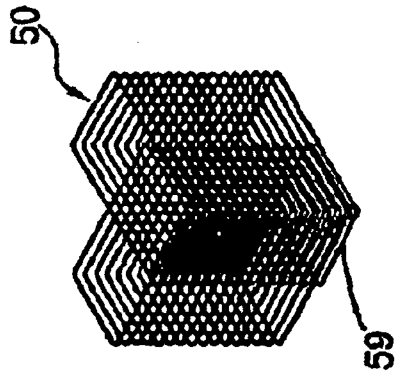
FIG. 14 illustrates an assemblage of spring-wire clips, each of the construction as illustrated in FIG. 13, to be loaded into the holder of the applicator of FIGS. 11 and 12.

The spring-wire clips 50 may be separate clips loaded within holder 61, one on top of the other; and urged upwardly by a spring or other pressing mechanism as briefly described above. Alternatively, the spring-wire clips 50 may be in the form of an assemblage of spring-wire clips made of bent spring wire interconnected together by severance lines enabling individual spring-wire clips to be severed from the assemblage at the time of application of the spring-wire clip to the paper sheets. This is illustrated in FIG. 14, wherein the severance lines are shown at 59.

Figure 16:
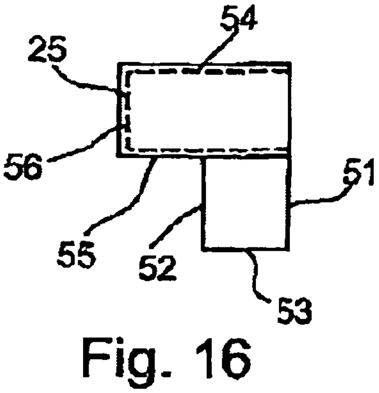
FIGS. 16 illustrates a spring-wire clip corresponding to that of FIG. 13 but modified for providing a larger surface for securing the paper sheets, and/or for carrying advertising matter.

Spring-wire clips 50 may also be used for carrying commercial advertising, as shown in FIG. 16, wherein a strip 75, e.g., of paper, plastic or the like, is applied across the end section 51–53 of the spring-wire clip to increase the gripping surface of that section with respect to the paper sheets gripped by the spring-wire clip, and/or to provide a surface area for carrying advertising or the like.

While the applicators described above include manually-driven driving members, it will be appreciated that such applicators could include automatically-driven driving members, e.g., similar to automatic stapling machines. Thus, the described spring-wire clip applicators could include a sensor to sense the presence of the papers to be clipped at the proper location and to automatically actuate the driving member for applying the spring-wire clips in the manner described above. Also, the described applicators could be loaded with individual spring-wire clips or with cartridges, could be loaded from the front wall or top wall, and could be incorporated in, or constructed as attachments to, various types of paper-handling equipment, such as photocopying machines, printing machines, etc. Further, while the invention has been described above for applying spring-wire clips to a plurality of paper sheets, it will be appreciated that it could be used for applying spring-wire clips to other types of sheets to be gripped, e.g., plastic sheets.

Accordingly, while the invention has been described with respect to a number of specific embodiments, it will be appreciated that these are set forth merely for purposes of example, and that many other variations, modifications and applications of the invention may be made.

What is claimed is:

1. An applicator for applying, to a plurality of sheets, clips made of bent spring-wire having first and second end sections joined together by an elastically-deformable wire juncture section, said applicator comprising:

a holder for holding a plurality of said clips in a manner to successively feed them one at a time to a sheet-clipping station, with the wire juncture section facing one side of the sheet-clipping station;

a driving member at said one side of the sheet-clipping station for engaging the clip in the sheet-clipping station and for driving the clip towards the other side of the sheet-clipping station for spreading said end sections apart in order to receive the sheets to be clipped by the driven clip;

said holder is configured to hold clips in which said first end section of each clip overlies said second end section of the respective clip, wherein said first end section is wider than said second end section such as to project outwardly thereof on the opposite sides of said clip, and said first end section is shorter than said second end section such that said second end section projects axially past said first end section;

said applicator further includes a first pair of deflector surfaces located on opposite sides of said sheet-clipping station and configured to engage the underside of outwardly projecting portions of the first end section of the clip, when driven by said driving member to deflect said first end section away from said second end section; and said applicator further includes a second pair of deflector surfaces located on opposite sides of said sheet-clipping station, and configured to engage an upper side of the axially projecting portion of said second end sections of the clip, when driven by said driving member, wherein said second pair of deflector surfaces are closer to each other than said first pair of deflector surfaces.

2. The applicator according to claim 1, wherein said first pair of deflector surfaces are upwardly sloping surfaces.

3. The applicator according to claim 2, wherein said second pair of deflector surfaces are downwardly sloping surfaces configured for deflecting said second end section away from said first end section.

4. The applicator according to claim 1, wherein said driving member is a sliding bar engageable with the wire juncture section of the clip in the sheet-clipping station.

5. The applicator according to claim 1, wherein said holder is configured to hold clips in which said first end section carries a strip having advertising thereon.

6. The applicator according to claim 1, wherein said plurality of clips loaded in said holder are an assemblage of clips interconnected together but formed with severance lines to facilitate severing each from the assemblage at the time of application of a clip to the sheets.

7. An applicator for applying, to a plurality of sheets, clips made of bent spring-wire having first and second end sections spaced from each other and joined together by an elastically-deformable wire juncture section, said applicator comprising:

a holder for holding a plurality of said clips in a manner to successively feed them one at a time to a sheet-clipping station;

a driving member at said sheet-clipping station for engaging the clip in the sheet-clipping station and for advancing the clip towards said plurality of sheets to be clipped;

and a deflector member mounted within said holder and extending transversely through the longitudinal axis of the one or more clips that are accommodated in said holder through the space between said first and second end sections of each such clip including said clip located in the sheet-clipping station, said deflector being located to engage one of said end sections of said clip in the sheet-clipping station and to deflect said engaged end section away from the other end section when said clip is being advanced by said driving member towards said plurality of sheets, so as to spread said end sections apart in order to receive the plurality of sheets between said spaced end sections of the clip.

8. The applicator according to claim 7, wherein said first and second end sections of the clips are spaced from each other along the longitudinal axis of the clip, and wherein said deflector is substantially aligned with said longitudinal axis to engage a portion of said one end section extending transversely across said longitudinal axis.

9. The applicator according to claim 8, wherein said driving member engages the wire juncture section of the clip in the sheet-clipping section for advancing it towards the plurality of sheets.

10. The applicator according to claim 8, wherein said holder is mounted on a base defining said sheet-clipping station.

11. The applicator according to claim 8, wherein said holder accommodates a cartridge for storing said plurality of clips, said cartridge being attachable to said holder to align an end clip within the cartridge with said sheet-clipping station, and said cartridge being detachable from said applicator for replacement by another cartridge storing another plurality of clips.

12. The applicator according to claim 8, wherein said driving member is a sliding bar engageable with the wire juncture section of the clip in the sheet-clipping station.

13. The applicator according to claim 8, wherein said holder is configured to hold clips in which the two spaced end sections of the clips are coplanar and parallel to each other, one end section being shorter than the other, said deflector extending through the space between said two end sections so as to be engageable with the shorter end section to deflect it away from the longer end section.

14. The applicator according to claim 13, wherein said holder holds the plurality of clips in the form of a stack, and wherein said deflector includes an elongated strip extending through the spaces between the two end sections of the clips in the stack such as to be engageable with the shorter end section of the clip within the sheet-clipping station to deflect same away from the other end section of the respective clip when the respective clip is driven by said drive member.

15. The applicator according to claim 13, wherein the applicator further includes a second deflector engageable with the longer end section of the clip in the sheet-clipping station for deflecting the longer end section away from the shorter end section of the respective clip when the respective clip is being advanced by the drive member.

16. The applicator according to claim 15, wherein said second deflector includes a sloping surface at said other side of the sheet-clipping station.

17. The applicator according to claim 7, wherein said first and second end sections of the clips are angularly spaced from each other, and said driving member is a rotary drive member engageable with the wire juncture section of the clip in the sheet-clipping station to rotate said clip about an axis of rotation towards said plurality of sheets to be clipped.

18. The applicator according to claim 17, wherein said holder is configured to hold clips in which the two end sections are angularly spaced from each other so as to be substantially perpendicular to each other.

19. The applicator according to claim 17, wherein said deflector extending through said space between the first and second end sections of the clip in the sheet-clipping station is inclined with respect to said end sections such as to engage the upper surface of one end section, and the lower surface of the other end section, and thereby to spread apart the two end sections of the clip, as the clip is rotated by said rotary drive member towards said plurality of sheets.

20. An applicator for applying, to a plurality of sheets, clips made of bent spring-wire having first and second end sections spaced from each other and joined together by an elastically-deformable wire juncture section, said applicator comprising:

a holder for holding a plurality of said clips in a manner to successively feed them one at a time to a sheet-clipping station;

a driving member at said sheet-clipping station for engaging the clip in the sheet-clipping station and for advancing the clip towards said plurality of sheets to be clipped;

and a deflector member mounted within said holder to extend transversely to the longitudinal axis of the one or more clips that are accommodated in said holder through the space between said first and second end sections of each such clip in the sheet-clipping station, said deflector being located to engage one of said end sections of said clip in the sheet-clipping station and to deflect said engaged end section away from the other end section when said clip is being advanced by said driving member towards said plurality of sheets, so as to spread said end sections apart in order to receive the plurality of sheets between said spaced end sections of the clip, wherein the applicator includes a second deflector for engaging said other end section of the clip, and for deflecting said other end in an opposite direction to said deflector member.

* * * * *